United States Patent
Teshima

[11] Patent Number: 6,100,331
[45] Date of Patent: Aug. 8, 2000

[54] GRAFT COPOLYMER AND STYRENE-BASED RESIN COMPOSITION

[75] Inventor: Hideo Teshima, Ichihara, Japan

[73] Assignee: Idemitsu Petrochemical Co., Ltd., Tokyo, Japan

[21] Appl. No.: 09/025,850

[22] Filed: Feb. 19, 1998

[30] Foreign Application Priority Data

| Feb. 21, 1997 | [JP] | Japan | 9-037959 |
| Feb. 21, 1997 | [JP] | Japan | 9-037960 |
| Feb. 21, 1997 | [JP] | Japan | 9-037961 |

[51] Int. Cl.$^7$ .................................................. C08L 51/00
[52] U.S. Cl. .............................. 525/76; 525/75; 525/86; 525/241; 525/245; 525/247; 525/249; 525/268; 525/289; 525/292; 525/316
[58] Field of Search .................. 525/76, 75, 86, 525/241, 245, 247, 249, 268, 289, 292, 316

[56] References Cited

U.S. PATENT DOCUMENTS

| 4,327,201 | 4/1982 | Kennedy et al. . |
| 5,247,020 | 9/1993 | Nakano et al. . |
| 5,362,814 | 11/1994 | Machida et al. . |
| 5,418,276 | 5/1995 | Machida et al. . |

FOREIGN PATENT DOCUMENTS

0 559 108  9/1993  European Pat. Off. .

OTHER PUBLICATIONS

Patent Abstracts of Japan, vol. 18, No. 97 (C–1167), Feb. 17, 1994, JP 5–295056, Nov. 09, 1993.

*Primary Examiner*—Mark L. Warzel
*Attorney, Agent, or Firm*—Oblon, Spivak, McClelland, Maier & Neustadt, P.C.

[57] ABSTRACT

Disclosed is a graft copolymer (A+B) of a styrene-based monomer (A) and a terminal styrene derivative-modified olefin-based macromer (B) of formula (1), having a high degree of syndiotacticity for the stereospecificity of the chains derived from the styrene-based monomer:

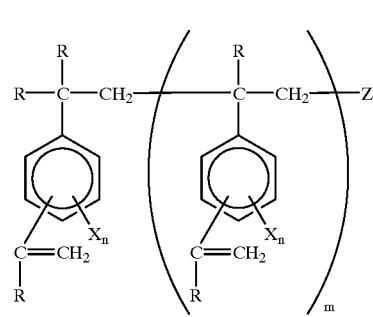

(1)

R is H or alkyl; X is H, halogen, or a substituent having one or more of C, Sn and Si; n is 1 to 4; m is 0 or a natural number; Z is a chain moiety derived from an olefin-based monomer. The copolymer is prepared by copolymerizing (A) and (B) in the presence of a catalyst comprising (a) a transition metal compound, (b) (i) a specific oxygen-containing compound and/or (ii) a compound capable of reacting with the compound (a) to form an ionic complex, and optionally (c) an alkylating agent. The graft copolymer (A+B) and a styrene-based resin composition comprising the graft copolymer (A+B) or comprising the macromer (B) have good heat resistance, good chemical resistance, high stiffness and good miscibility with various resins, and are useful as component parts for composite materials and also as heat-resistant elastomers.

7 Claims, No Drawings

GRAFT COPOLYMER AND STYRENE-BASED RESIN COMPOSITION

FIELD OF THE INVENTION

The present invention relates to a graft copolymer, a method for producing it, and a styrene-based resin composition. More precisely, the invention relates to a syndiotactic polystyrene copolymer having, as the graft component, a polyolefin-based elastomer, which has good heat resistance, good chemical resistance, high stiffness and good miscibility with other resins, and which is useful as a constituent material for composite materials or as a heat-resistant elastomer; to a method for efficiently producing the copolymer; and to a styrene-based resin composition with good heat resistance, good chemical resistance and high stiffness, which is extremely useful as a constituent material for composite materials or as a heat-resistant elastomer in the field of electric and electronic appliances for household and industrial use.

BACKGROUND OF THE INVENTION

Having succeeded in developing styrene-based polymers with high syndiotacticity, the research group of the present inventors further developed syndiotactic styrene-based copolymers through copolymerization of the styrene-based monomer as used in producing the syndiotactic styrene-based polymers, and other components (see Japanese Patent Application Laid-Open Nos. 62-104818 and 63-241009). However, though those syndiotactic styrene-based polymers and copolymers had good heat resistance and good chemical resistance, their stiffness and elongation were poor and their miscibility with other resins was also poor. Therefore, their use was inevitably limited. To improve their stiffness and elongation and even their miscibility with other resins, proposed were graft copolymers as produced through graft-copolymerization of a high-molecular polymer having double bonds in its side chains, and a styrene-based monomer; and block copolymers as produced through block-copolymerization of a macro-monomer terminated with a polymerizable active vinyl group, and a styrene-based monomer (see Japanese Patent Application Laid-Open Nos. 5-247147 and 5-295056).

However, those styrene-based graft copolymers and block copolymers as concretely illustrated in the laid-open patent specifications are problematic in their properties. Specifically, in the olefin-based segments to constitute them, the reactive groups exist at random. Therefore, when the olefin-based segments are copolymerized with a styrene-based monomer at the reactive groups therein, they are crosslinked to interfere with the effective formation of graft copolymers. At present, no styrene-based graft or block copolymers are obtained having satisfactory stiffness and even miscibility with other resins.

In order to improve their stiffness, the conventional styrene-based graft or block copolymers are blended with a rubber component such as hydrogenated styrene-butadiene-styrene block (SEBS) copolymer or the like. However, such is problematic in that the rubber component is expensive, that it indispensably requires the additional step of blending the copolymer with such an expensive rubber component, and that the addition of the amorphous component inevitably worsens the intrinsic characteristics (heat resistance, rapid crystallizability) of SPS (syndiotactic polystyrene). Accordingly, desired are techniques for producing syndiotactic styrene-based polymers or copolymers with high stiffness and even good miscibility with other resins.

SUMMARY OF THE INVENTION

Given that situation, the object of the present invention is to provide a syndiotactic styrene-based graft copolymer, which has good heat resistance, good chemical resistance, high stiffness and elongation, and good miscibility with other resins and which is useful as a constituent material for composite materials or as a heat-resistant elastomer; to provide a method for efficiently producing the copolymer; and to provide a styrene-based resin composition.

In order to attain the object, we, the present inventors have assiduously studied and, as a result, have found that a graft copolymer as produced through grafting copolymerization of a styrene-based monomer and a terminal styrene derivative-modified olefin-based macromer, of which the terminal of the repetitive olefin-based monomer units is modified with a styrene derivative, to have a high degree of syndiotacticity for the stereospecificity of the chains derived from the styrene-based monomer has good heat resistance, good chemical resistance, high stiffness and elongation, and good miscibility with other resins, and that the graft copolymer is efficiently produced by dissolving the terminal styrene derivative-modified olefin-based macromer in a styrene-based monomer or in a solvent containing a styrene-based monomer, followed by copolymerizing them.

Further, the inventors have found that a styrene-based resin composition comprising the graft copolymer and a thermoplastic resin has good heat resistance, good chemical resistance, and high stiffness and elongation, and that the constituent components are well miscible with each other to give the composition.

Still further, the inventors have found that a styrene-based resin composition comprising a terminal styrene derivative-modified olefin-based macromer (terminal styrene derivative-modified olefin-based polymer), of which the terminal of the repetitive olefin-based monomer units is modified with a styrene derivative, and a syndiotactic styrene-based polymer (syndiotactic polystyrene, SPS) has good heat resistance, good chemical resistance, and high stiffness and elongation, and that the constituent components are well miscible with each other to give the composition. On the basis of these findings, the inventors have completed the present invention.

Specifically, the invention provides the following:

(1) A graft copolymer (A+B) of a styrene-based monomer (A) and a terminal styrene derivative-modified olefin-based macromer (B) of the following general formula (1), having a high degree of syndiotacticity for the stereospecificity of the chains derived from the styrene-based monomer:

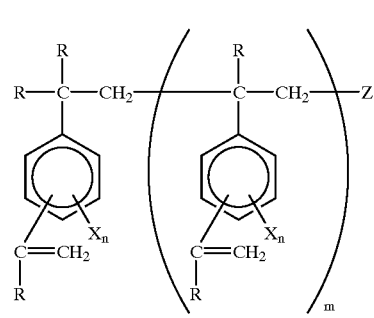

(1)

wherein R represents a hydrogen atom or an alkyl group having from 1 to 20 carbon atoms, and plural R's may be the same or different;

X represents any of the following; ① a hydrogen atom, ② a halogen atom, or ③ a substituent having one or more selected from carbon, tin and silicon atoms;

n represents an integer of from 1 to 4, and when n is 2 or more, plural X's may be the same or different;

m represents 0 or a natural number; and

Z represents a chain moiety derived from an olefin-based monomer.

(2) The graft copolymer (A+B) of (1), comprising from 0.1 to 99.9% by weight of polymer segments derived from the styrene-based monomer (A) and from 0.1 to 99.9% by weight of polymer segments derived from the terminal styrene derivative-modified olefin-based macromer (B) of formula (1).

(3) A method for producing a graft copolymer (A+B) of (1) or (2), comprising dissolving a terminal styrene derivative-modified olefin-based macromer (B) of formula (1) in a styrene-based monomer (A) or in a solvent containing a styrene-based monomer (A), followed by copolymerizing (A) and (B) in the presence of a catalyst comprising (a) a transition metal compound and (b) (i) an oxygen-containing compound of a general formula (2):

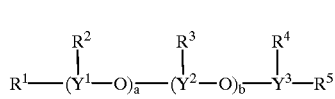

(2)

wherein $R^1$ to $R^5$ each represent an alkyl group having from 1 to 8 carbon atoms, and these may be the same or different;

$Y^1$ to $Y^3$ each represent an element of Group 13 of the Periodic Table, and these may be the same or different; and a and b each represent a number of from 0 to 50, provided that a+b is 1 or more;

and/or a general formula (3):

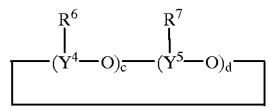

(3)

wherein $R^6$ and $R^7$ each represent an alkyl group having from 1 to 8 carbon atoms, and these may be the same or different;

$Y^4$ and $Y^5$ each represent an element of Group 13 of the Periodic Table, and these may be the same or different; and c and d each represent a number of from 0 to 50, provided that c+d is 1 or more, and/or (ii) a compound capable of reacting with the transition metal compound of the component (a) to form an ionic complex.

(4) A method for producing a graft copolymer (A+B) of (1) or (2), comprising dissolving a terminal styrene derivative-modified olefin-based macromer (B) of formula (1) in a styrene-based monomer (A) or in a solvent containing a styrene-based monomer (A), followed by copolymerizing (A) and (B) in the presence of a catalyst comprising (a) a transition metal compound, (b) (i) an oxygen-containing compound of a general formula (2):

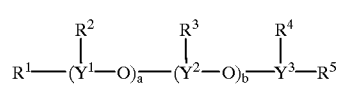

(2)

wherein $R^1$ to $R^5$ each represent an alkyl group having from 1 to 8 carbon atoms, and these may be the same or different;

$Y^1$ to $Y^3$ each represent an element of Group 13 of the Periodic Table, and these may be the same or different; and a and b each represent a number of from 0 to 50, provided that a+b is 1 or more;

and/or a general formula (3):

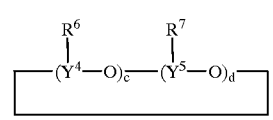

(3)

wherein $R^6$ and $R^7$ each represent an alkyl group having from 1 to 8 carbon atoms, and these may be the same or different;

$Y^4$ and $Y^5$ each represent an element of Group 13 of the Periodic Table, and these may be the same or different; and c and d each represent a number of from 0 to 50, provided that c+d is 1 or more, and/or (ii) a compound capable of reacting with the transition metal compound of the component (a) to form an ionic complex, and (c) an alkylating agent.

(5) A styrene-based resin composition comprising from 0.1 to 99.9% by weight of a graft copolymer (A+B) of (1) and from 0.1 to 99.9% by weight of a thermoplastic resin (C) except the copolymer (A+B).

(6) A styrene-based resin composition comprising from 0.1 to 99.9% by weight of a terminal styrene derivative-modified olefin-based macromer (B) of formula (1) and from 0.1 to 99.9% by weight of a syndiotactic styrene-based polymer, syndiotactic polystyrene (SPS).

DESCRIPTION OF PREFERRED EMBODIMENTS OF THE INVENTION

Hereinunder described are preferred embodiments of the present invention.

1. Graft Copolymer:

The graft copolymer (A+B) of the invention is composed of a styrene-based monomer (A) and a terminal styrene derivative-modified olefin-based macromer (B) of formula (1) noted above, and has a high degree of syndiotacticity for the stereospecificity of the chains derived from the styrene-based monomer.

(1) Styrene-based Monomer (A):

The styrene-based monomer for use in the invention is a compound of a general formula (4):

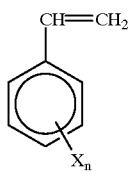

(4)

wherein X represents any of the following; ① a hydrogen atom, ② a halogen atom, or ③ a substituent having one or more selected from carbon, tin and silicon atoms;

n represents an integer of from 1 to 4, and when n is 2 or more, plural X's may be the same or different;

Specific examples of the compound include styrene; alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tert-butylstyrene; vinylbenzenes such as p-divinylbenzene, m-divinylbenzene, tridivinylbenzene; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene; alkoxystyrenes such as methoxystyrene, ethoxystyrene, t-butoxystyrene; vinylbiphenyls; vinylphenylnaphthalenes; vinylphenylanthracenes; halogenovinylbiphenyls; trialkylsilylvinylbiphenyls; halogenoalkylstyrenes; alkylsilylstyrenes; phenylsilylstyrenes; halogenosilylstyrenes; silyl-silylstyrenes; and their mixtures.

(2) Terminal Styrene Derivative-modified Olefin-based Macromer (B):

① Olefin-based monomers for the macromer (B) include, for example, α-olefins such as ethylene, propylene, butene-1, pentene-1, hexene-1, heptene-1, octene-1, nonene-1, decene-1,4-phenylbutene-1,6-phenylhexene-1,3-methylbutene-1,4-methylpentene-1,3-methylpentene-1,3-methylhexene-1,4-methylhexene-1,5-methylhexene-1,3,3-dimethylpentene-1,3,4-dimethylpentene-1,4,4-dimethylpentene-1, vinylcyclohexane; halogeno-α-olefins such as hexafluoropentene, tetrafluoroethylene, 2-fluoropropene, fluoroethylene, 1,1-difluoroethylene, 3-fluoropropene, trifluoroethylene, 3,4-dichlorobutene-1; and cyclic olefins such as cyclopentene, cyclohexene, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene One or more of those olefin-based monomers are used for the macromer (B). In the macromer (B) comprising repetitive olefin-based monomer units, preferably, the repetitive units may be of any one of the olefin monomers mentioned above or may be of two or more of those as copolymerized to give random or block copolymer segments.

② The terminal styrene derivative-modified olefin-based macromer (B) is represented by the following general formula (1), wherein the terminal of the repetitive units of the olefin-based monomers must be modified with a styrene derivative.

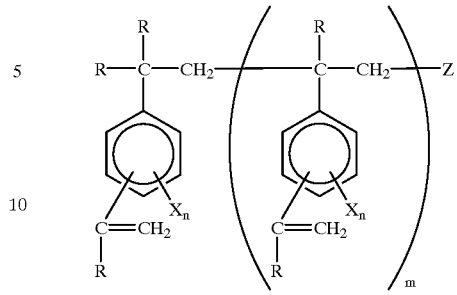

(1)

In formula (1), R represents a hydrogen atom or an alkyl group having from 1 to 20 carbon atoms, and plural R's may be the same or different; and X represents any of the following; ① a hydrogen atom, ② a halogen atom, or ③ a substituent having one or more selected from carbon, tin and silicon atoms. Concretely, X may be a hydrogen atom; a halogen atom such as chlorine, bromine or fluorine atom; or an alkyl group such as methyl, ethyl or tert-butyl group, an alkoxy group such as methoxy, ethoxy or t-butoxy group, a vinyl or vinylphenyl group, a halogenoalkyl group, an alkylsilyl group, a phenylsilyl group, a halogenosilyl group or a silylsilyl group. n represents an integer of from 1 to 4, and when n is 2 or more or, that is, when the formula has plural X's, those plural X's may be the same or different. m represents 0 or a natural number, and Z represents a chain moiety to be derived from olefin-based monomers such as those mentioned above. In the styrene derivative moiety existing at the terminal of the structure of formula (1), the position of the vinyl group (when R is a hydrogen atom) or that of the alkylvinyl group (when R is an alkyl group) may be any of the ortho-, meta- or para-position, but is preferably the para-position.

③ The method for producing the terminal styrene derivative-modified olefin-based macromer (B) of formula (1) is not specifically defined. The macromer (B) may be produced in any known method, for example, in the method disclosed in Japanese Patent Application Laid-Open No. 6-122711. Concretely, it may be produced through living polymerization of olefins using a catalyst comprising a specific vanadium compound and an organic aluminium compound, in which the polymer being produced is reacted with a styrene derivative in the final stage of the polymerization.

(3) The graft copolymer of the invention is prepared by copolymerization of the styrene-based monomer (A) and the terminal styrene derivative-modified olefin-based macromer (B) of formula (1). Preferably, the graft copolymer comprises from 0.1 to 99.9% by weight, more preferably from 1.0 to 99.0% by weight, even more preferably from 5.0 to 95.0% by weight of polymer segments derived from the styrene-based monomer (A), and from 0.1 to 99.9% by weight, more preferably from 1.0 to 99.0% by weight, even more preferably from 5.0 to 95.0% by weight of polymer segments derived from the terminal styrene derivative-modified olefin-based macromer (B) of formula (1). The graft copolymer has a high degree of syndiotacticity for the stereospecificity of the chains derived from the styrene-based monomer. Specifically, the stereospecificity is of racemidiad of 75% or higher, preferably 85% or higher, or of racemipentad of 30% or higher, preferably 50% or higher. Where a mixture of two or more different styrene-based monomers is used in preparing the graft copolymer, the plural monomers may be random-copolymerized or block-copolymerized to give random segments or block segments in the resulting graft copolymer.

2. Method for Producing Graft Copolymer:

The method for producing the graft copolymer of the invention is not specifically defined. For example, even when a powdery, terminal styrene derivative-modified olefin-based macromer (B) is added to a syndiotactic polystyrene powder previously prepared through chemical synthesis, and then subjected to heat history, then they start to react with each other to give the intended graft copolymer. Preferably, however, a terminal styrene derivative-modified olefin-based macromer (B) is dissolved in a styrene-based monomer (A) or in a solvent containing a styrene-based monomer (A), and thereafter (B) and (A) are copolymerized with each other, in the presence of a catalyst comprising (a) a transition metal compound, and (b) (i) an oxygen-containing compound, which is mentioned in detail hereinunder, and/or (ii) a compound capable of reacting with the transition metal compound of the component (a) to form an ionic complex, and optionally (c) an alkylating agent, to give the intended graft copolymer. This method comprising dissolving a terminal styrene derivative-modified olefin-based macromer (B) in a styrene-based monomer (A) or in a solvent containing a styrene-based monomer (A) is preferred, as attaining uniform copolymerization of (A) and (B). The solvent is not specifically defined, but is preferably selected from hydrocarbons such as toluene, benzene and ethylbenzene. The catalyst to be preferably used for the copolymerization is described in detail hereinunder.

(1) Constituents of Catalyst:

(a) Transition Metal Compound:

Various transition metal compounds are usable herein, but preferred are those of the following general formula (5) or (6):

(5)

(6)

wherein M represents a metal of Groups 3 to 6 of the Periodic Table, or a lanthanide metal;

$R^8$, $R^9$, $R^{10}$ and $R^{11}$ each represent an alkyl group, an alkoxy group, an aryl group, an alkylaryl group, an arylalkyl group, an aryloxy group, an acyloxy group, a cyclopentadienyl group, an alkylthio group, an arylthio group, a substituted cyclopentadienyl group, an indenyl group, a substituted indenyl group, a fluorenyl group, an amino group, an amido group, a phosphido group, a halogen atom, or a chelating agent;

a, b and c each represent an integer of from 0 to 4;

d and e each represent an integer of from 0 to 3; and any two of $R^8$ to $R^{11}$ may be crosslinked via $CH_2$, $Si(CH_3)_2$ or the like to give a complex.

The metal of Groups 3 to 6 of the Periodic Table or the lanthanide metal for M is preferably a metal of Group 4, more preferably titanium, zirconium, hafnium or the like.

Preferred titanium compounds are represented by a general formula (7):

(7)

wherein R represents a cyclopentadienyl group, a substituted cyclopentadienyl group, an indenyl group, a substituted indenyl group, a fluorenyl group or the like;

X, Y and Z each independently represent a hydrogen atom, an alkyl group having from 1 to 20 carbon atoms, an alkoxy group having from 1 to 20 carbon atoms, an aryl group having from 6 to 20 carbon atoms, an alkylaryl group, an arylalkyl group, an aryloxy group having from 6 to 20 carbon atoms, an acyloxy group having from 1 to 20 carbon atoms, an amino group having from 1 to 50 carbon atoms, an amido group, a phosphido group, an alkylthio group, an arylthio group, or a halogen atom; and any one of X, Y and Z may be crosslinked with R via $CH_2$, $SiR_2$ or the like.

Of the titanium compounds, more preferred are those having no halogen atom. Especially preferred are titanium compounds having one π-electron ligand, such as those mentioned hereinabove.

Also usable are condensed titanium compounds of a general formula (8):

(8)

wherein $R^{12}$ and $R^{13}$ each represent a halogen atom, an alkoxy group having from 1 to 20 carbon atoms, or an acyloxy group; and k represents from 2 to 20.

The titanium compounds may be of complexes with esters, ethers or the like.

Further usable as the component (a) is at least one selected from transition metal compounds having two, conjugate π-electron-having ligands, such as those of a general formula (9):

(9)

wherein $M^1$ represents titanium, zirconium or hafnium; $R^{14}$ and $R^{15}$ each represent a cyclopentadienyl group, a substituted cyclopentadienyl group, an indenyl group or a fluorenyl group;

$R^{16}$ and $R^{17}$ each represent a hydrogen atom, a halogen atom, a hydrocarbon group having from 1 to 20 carbon atoms, an alkoxy group having from 1 to 20 carbon atoms, an amino group, or a thioalkoxy group having from 1 to 20 carbon atoms; and $R^{14}$ and $R^{15}$ may be crosslinked via a hydrocarbon group having from 1 to 5 carbon atoms, an alkylsilyl group having from 1 to 20 carbon atoms and from 1 to 5 silicon atoms, or a germanium-containing hydrocarbon group having from 1 to 20 carbon atoms and from 1 to 5 germanium atoms.

Still further usable as the component (a) is at least one selected from transition metal compounds having a structure of a general formula (10):

(10)

wherein R' is a π-ligand, and represents a condensed polycyclic cyclopentadienyl group of a polycyclic ring having a condensed cyclopentadienyl group moiety, of which at least one constituent ring is a saturated ring;

M has the same meaning as above;

X' represents a σ-ligand, and plural X's, if any, may be the same or different, or may be bonded to each other via any group;

$L^1$ represents a Lewis base;

p represents the number of valency of M; and q represents 0, 1 or 2, and plural $L^1$'s, if any, may be the same or different.

In formula (10), R' is a π-ligand, and represents a condensed polycyclic cyclopentadienyl group of a polycyclic ring having a condensed cyclopentadienyl group moiety, of which at least one constituent ring is a saturated ring. or example, the condensed polycyclic cyclopentadienyl group of that type may be selected from those of formulae (11) to (13):

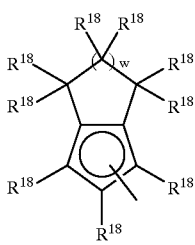
(11)

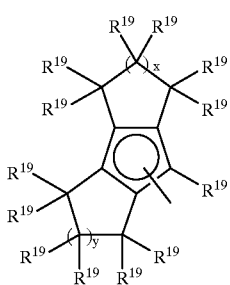
(12)

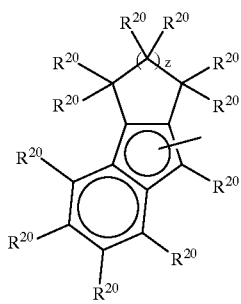
(13)

wherein $R^{18}$, $R^{19}$ and $R^{20}$ each represent a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amido group, a carboxyl group, or an alkylsilyl group; and plural $R^{18}$'s, $R^{19}$'s and $R^{20}$'s, if any, may be the same or different; and w, x, y and z each represent an integer of 1 or more.

Of those, preferred are 4,5,6,7-tetrahydroindenyl groups, since the catalytic activity of the catalysts having any of those groups is high and since the catalysts are easy to produce.

Specific examples of the group R' include a 4,5,6,7-tetrahydroindenyl group; a 1-methyl-4,5,6,7-tetrahydroindenyl group; a 2-methyl-4,5,6,7-tetrahydroindenyl group; a 1,2-dimethyl-4,5,6,7-tetrahydroindenyl group; a 1,3-dimethyl-4,5,6,7-tetrahydroindenyl group; a 1,2,3-trimethyl-4,5,6,7-tetrahydroindenyl group; a 1,2,3,4,5,6,7-heptamethyl-4,5,6,7-tetrahydroindenyl group; a 1,2,4,5,6,7-hexamethyl-4,5,6,7-tetrahydroindenyl group; a 1,3,4,5,6,7-hexamethyl-4,5,6,7-tetrahydroindenyl group; an octahydrofluorenyl group; 1,2,3,4-tetrahydrofluorenyl group; a 9-methyl-1,2,3,4-tetrahydrofluorenyl group; and a 9-methyl-octahydrofluorenyl group.

M represents a metal of Groups 3 to 6 of the Periodic Table, or a lanthanide metal, including, for example, titanium, zirconium, hafnium, lanthanide metals, niobium and tantalum. Of those, preferred is titanium in view of the high catalytic activity of the catalysts comprising it. X' represents a σ-ligand, including, for example, a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amido group, a carboxyl group, and an alkylsilyl group. Plural X's, if any, may be the same or different, or may be bonded to each other via any group.

In the transition metal compounds of formula (10), preferably, R' and X' are selected from those specifically mentioned hereinabove.

Still further usable as the component (a) are any of transition metal compounds of a general formula (14):

$$R^{21}MX_{a-1}L_b \qquad (14)$$

wherein $R^{21}$ represents a hexahydroazurenyl group of the following general formula (15);

M represents a transition metal;

X represents a σ-ligand, and plural X's, if any, may be the same or different, or may be bonded to each other via any group;

L represents a Lewis base;

a represents the number of valency of M; and b represents 0, 1 or 2, and plural L's, if any, may be the same or different.

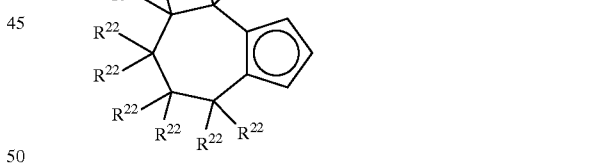
(15)

wherein $R^{22}$ represents a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amido group, a carboxyl group, or an alkylsilyl group, and plural $R^{22}$'s may be the same or different.

Specific examples of the group $R^{21}$ include a hexahydroazurenyl group, a 1-methylhexahydroazurenyl group, a 2-methylhexahydroazurenyl group, a 1,2-dimethylhexahydroazurenyl group, a 1,3-dimethylhexahydroazurenyl group, and a 1,2,3-trimethylhexahydroazurenyl group.

M represents a transition metal, including, for example, titanium, zirconium, hafnium, lanthanide metals, niobium and tantalum. X represents a σ-ligand, including, for example, a hydrogen atom, a halogen atom, an aliphatic hydrocarbon group having from 1 to 20 carbon atoms, an aromatic hydrocarbon group having from 6 to 20 carbon atoms, an alkoxy group having from 1 to 20 carbon atoms, an aryloxy group having from 6 to 20 carbon atoms, a thioalkoxy group having from 1 to 20 carbon atoms, a thioaryloxy group having from 6 to 20 carbon atoms, an amino group, an amido group, a carboxyl group, and an alkylsilyl group, and plural X's, if any, may be the same or different, or may be bonded to each other via any group. Specific examples of the group X include a hydrogen atom, a chlorine atom, a bromine atom, a methyl group, a benzyl group, a phenyl group, a trimethylsilylmethyl group, a methoxy group, an ethoxy group, a phenoxy group, a thiomethoxy group, a thiophenoxy group, a dimethylamino group, and a diisopropylamino group. L represents a Lewis base, a represents the number of valency of M, and b represents 0, 1 or 2.

(b) (i) Oxygen-containing Compound and/or (ii) Compound Capable of Reacting with Transition Metal Compound to Form Ionic Complex:

The component (b) constituting the polymerization catalyst for use in the invention comprises (i) an oxygen-containing compound and/or (ii) a compound capable of reacting with a transition metal compound to form an ionic complex, such as those mentioned in detail hereinunder.

(i) Oxygen-containing Compound:

The oxygen-containing compound for the component (b) is represented by the following general formulae (2) and/or (3):

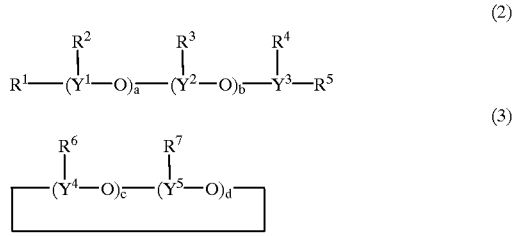

In these formulae (2) and (3), $R^1$ to $R^7$ each represent an alkyl group having from 1 to 3 carbon atoms, which includes, for example, a methyl group, an ethyl group, an n-propyl group, an isopropyl group, various butyl groups, various pentyl group, various hexyl groups, various heptyl groups, and various octyl groups. $R^1$ to $R^5$ may be the same or different; and $R^6$ and $R^7$ may be the same or different. $Y^1$ to $Y^5$ each represent an element of Group 13 of the Periodic Table, which includes, for example, B, Al, Ga, In and Tl. Of those, preferred are B and Al. $Y^1$ to $Y^3$ may be the same or different; and $Y^4$ and $Y^5$ may be the same or different. a to d each represent a number of from 0 to 50, provided that (a+b) and (c+d) each must be 1 or more. Preferably, a to d each fall between 1 and 20, more preferably between 1 and 5.

As the oxygen-containing compound of the catalyst component, preferred are alkylaluminoxanes, especially those of such that the high-magnetic component part of the methyl proton signal of the compound appearing in its $^1$H-NMR spectrum based on its aluminium-methyl bonding (Al—CH$_3$) accounts for not larger than 50% of the overall signal region. Precisely, when an alkylaluminoxane is subjected to $^1$H-NMR spectrophotometry based on tetramethylsilane (TMS) in a solvent of toluene at room temperature, its $^1$H-NMR spectrum gives a methyl proton signal based on the bonding, Al—CH$_3$ of the compound in the range of from −0.5 to 1.0 ppm relative to the standard TMS, while the proton signal (0 ppm) of TMS in its $^1$H-NMR spectrum falls within the methyl proton region of the $^1$H-NMR spectrum of the compound, alkylaluminoxane based on its bonding, Al—CH$_3$. When the methyl proton signal region appearing in the $^1$H-NMR spectrum of the compound, alkylaluminoxane, based on its bonding, Al—CH$_3$, is analyzed on the basis of the methyl proton signal, 2.35 ppm, of toluene relative to the standard TMS, and divided into a high-magnetic component part (falling within the range between −0.5 and −0.1 ppm) and other magnetic component parts (falling within the range between −0.1 and 1.0 ppm), it is desirable that the high-magnetic component part for the alkylaluminoxane preferably usable in the invention as the catalyst component accounts for not larger than 50%, preferably from 5 to 45% of the overall methyl proton signal region for the compound.

(ii) Compound Capable of Reacting with Transition Metal Compound to Form Ionic Complex:

The compound capable of reacting with a transition metal compound to form an ionic complex for use in the invention includes, for example, anion/cation coordination complexes comprising plural groups as bonded to a metal, and Lewis acids. Known are various anion/cation coordination complexes comprising plural groups as bonded to a metal, of which, for example, those of the following formulae (16) and (17) are preferably used in the invention.

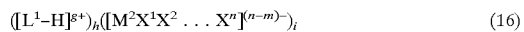

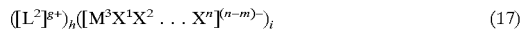

wherein $L^2$ represents $M^4$, $R^{23}R^{24}M^5$, or $R^{25}{}_3C$, which is mentioned below;

$L^1$ represents a Lewis base;

$M^2$ and $M^3$ each represent a metal selected from Groups 5 to 15 of the Periodic Table;

$M^4$ represents a metal selected from Group 1 and Groups 8 to 12 of the Periodic Table;

$M^5$ represents a metal selected from Groups 8 to 10 of the Periodic Table;

$X^1$ to $X^n$ each represent a hydrogen atom, a dialkylamino group, an alkoxy group, an aryloxy group, an alkyl group having from 1 to 20 carbon atoms, an aryl group having from 6 to 20 carbon atoms, an alkylaryl group, an arylalkyl group, a substituted alkyl group, an organic metalloid group, or a halogen atom;

$R^{23}$ and $R^{24}$ each represent a cyclopentadienyl group, a substituted cyclopentadienyl group, an indenyl group, or a fluorenyl group;

$R^{25}$ represents an alkyl group;

m represents the number of valency of $M^2$ and $M^3$, and is an integer falling between 1 and 7;

n represents an integer of from 2 to 8;

g represents the number of ionic valency of $L^1$–H and $L^2$, and is an integer falling between 1 and 7;

h is an integer of 1 or more; and i=h×g/(n−m).

Specific examples of $M^2$ and $M^3$ are atoms of B, Al, Si, P, As and Sb; those of $M^4$ are atoms of Ag, Cu, Na and Li; and those of $M^5$ are atoms of Fe, Co and Ni. Specific examples of $X^1$ to $X^n$ are dialkylamino groups such as dimethylamino and diethylamino groups; alkoxy groups such as methoxy, ethoxy and n-butoxy groups; aryloxy groups such as phenoxy, 2,6-dimethylphenoxy and naphthyloxy groups; $C_{1-20}$ alkyl groups such as methyl, ethyl, n-propyl, isopropyl, n-butyl, n-octyl and 2-ethylhexyl groups; $C_{6-20}$ aryl, alkylaryl and arylalkyl groups such as phenyl, p-tolyl, benzyl, pentafluorophenyl, 3,5-di (trifluoromethyl)phenyl, 4-tert-butylphenyl, 2,6-dimethylphenyl, 3,5-dimethylphenyl, 2,4-dimethylphenyl and 1,2-dimethylphenyl groups; halogens such as F, Cl, Br and I; and organic metalloid groups such as pentamethylantimonyl, trimethylsilyl, trimethylgermyl, diphenylarsinyl, dicyclohexylantimonyl and diphenylboryl groups. Specific examples of the substituted cyclopentadienyl group for $R^{23}$ and $R^{24}$ are methylcyclopentadienyl, butylcyclopentadienyl and pentamethylcyclopentadienyl groups.

The anion comprising plural groups as bonded to a metal, which constitutes the anion/cation coordination complexes for use in the invention, includes, for example, $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6H_5F_4^-$, $P(C_6F_5)_6^-$, and $Al(C_6HF_4)_4^-$. The metal cation for those complexes includes, for example, $Cp_2Fe^+$, $(MeCp)_2Fe^+$, $(tBuCp)_2Fe^+$, $(Me_2Cp)_2Fe^+$, $(Me_3Cp)_2 Fe^+$, $(Me_4CP)_2Fe^+$, $(Me_5Cp)_2Fe^+$, $Ag^+$, $Na^+$, and $Li^+$. As other cations for the complexes, for example, mentioned are those from nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, and N,N-diethylanilinium; carbenium ions such as triphenylcarbenium, tri(4-methylphenyl)carbenium and tri (4-methoxyphenyl)carbenium; alkylphosphonium ions such as $CH_3PH_3^+$, $C_2H_5PH_3^+$, $C_3H_7PH_3^+$, $(CH_3)_2PH_2^+$, $(C_2H_5)_2 PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, and $(C_3H_7)_4P^+$; and arylphosphonium ions such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5) PH_2^+$, $(CH_3)_2(C_6H_5)PH^+$, and $(C_2H_5)_2(C_6H_5)_2P^+$.

Preferred examples of compounds of formulae (16) and (17) are mentioned below. Preferred examples of compounds of formula (16) are triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl) borate, pyrrolinium tetra(pentafluorophenyl)borate, N,N-dimethylanilinium tetrakis(pentafluorophenyl)borate, and methyldiphenylammonium tetrakis(pentafluorophenyl) borate. Preferred examples of compounds of formula (17) are ferrocenium tetraphenylborate, dimethylferrocenium tetrakis(pentafluorophenyl)borate, ferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, and silver tetrafluoroborate.

The Lewis acids for use in the invention include, for example, $B(C_6F_5)_3$, $B(C_6HF_4)_3$, $B(C_6H_2F_3)_3$, $B(C_6H_3F_2)_3$, $B(C_6H_4F)_3$, $B[C_6(CF_3)F_4]_3$, $B(C_6H_5)_3$, $P(C_6F_5)_5$ and $Al(C_6HF_4)_3$. The component (b) constituting the polymerization catalyst for use in the invention may comprise one or more of the oxygen-containing compounds (i) either singly or as combined, or may comprise one or more of the compounds (ii) capable of reacting with a transition metal compound to form ionic complexes, either singly or as combined, or even may comprise a combination of those compounds (i) and (ii).

(c) Alkylating Agent:

Usable herein are various known alkylating agents, which include, for example, alkyl-containing aluminium compounds of a general formula (18):

$$R^{26}{}_m Al(OR^{27})_n X_{3-m-n} \tag{18}$$

wherein $R^{26}$ and $R^{27}$ each represent an alkyl group having from 1 to 8, preferably from 1 to 4 carbon atoms;

X represents a hydrogen atom, or a halogen atom;

$0 < m \leq 3$, but preferably m is 2 or 3, most preferably 3; and $0 \leq n < 3$, but preferably n is 0 or 1;

alkyl-containing magnesium compounds of a general formula (19):

$$R^{28}{}_2 Mg \tag{19}$$

wherein $R^{28}$ represents an alkyl group having from 1 to 8, preferably from 1 to 4 carbon atoms;

and alkyl-containing zinc compounds of a general formula (20):

$$R^{28}{}_2 Zn \tag{20}$$

wherein $R^{28}$ has the same meaning as above.

Of those alkyl-containing compounds, preferred are the alkyl-containing aluminium compounds. Especially preferred are trialkylaluminium compounds and dialkylaluminium compounds.

(2) Method for Producing Catalyst:

For catalytic polymerization to produce the graft copolymer of the invention in the presence of the catalyst comprising the components (a) and (b) and optionally the component (c), for example, employable is any of ① a method of adding the component (c) to a catalytic mixture of the components (a) and (b) to prepare a polymerization catalyst, followed by contacting the resulting catalyst with monomers to be polymerized, or that is, a solution of the macromer (B) in the styrene-based monomer (A) or a solution thereof in a solvent containing the styrene-based monomer (A); ② a method of adding the component (a) to a catalytic mixture of the components (b) and (c) to prepare a polymerization catalyst, followed by contacting the resulting catalyst with the monomers to be polymerized; ③ a method of adding the component (b) to a catalytic mixture of the components (a) and (c) to prepare a polymerization catalyst, followed by contacting the resulting catalyst with the monomers to be polymerized; ④ a method of separately contacting the components (a), (b) and (c) with the monomers to be polymerized; or ⑤ a method of contacting the component (c) with the monomers to be polymerized, followed by further contacting the resulting contact mixture with the catalyst as prepared in any of ① to ③ noted above.

The monomers to be polymerized may be contacted with the components (a) and (b) and optionally the component (c) at the polymerization temperature for the monomers, or even at any temperatures falling between −20 and 200° C.

The polymerization catalyst for use in the invention comprises a combination of the components (a) and (c) or a combination of the components (a), (b) and (c), but may further contain any other catalyst components. The mixing ratio of those catalyst components varies, depending on various conditions for the polymerization, and therefore could not be determined unconditionally. In general, however, where the component (b) comprises an oxygen-containing compound, the molar ratio of (a) to (b) is preferably from 1/1 to 1/10,000, more preferably from 1/1 to 1/1,000. Where the component (b) comprises a compound capable of reacting with a transition metal compound to form an ionic complex, the molar ratio of (a) to (b) is preferably from 0.1/1 to 1/0.1. Where the catalyst contains the component (c), the molar ratio of (a) to (b) is preferably from 1/0.1 to 1/1,000.

Prior to adding the components of the catalyst to the monomers to be polymerized, an organic aluminium compound such as triisobutyl aluminium may be added thereto in order to trap impurities.

(3) Polymerization Method:

The monomers may be polymerized through bulk polymerization or even through solution polymerization in an aliphatic hydrocarbon solvent such as pentane, hexane or heptane; or in an alicyclic hydrocarbon solvent such as cyclohexane; or in an aromatic hydrocarbon solvent such as benzene, toluene, xylene or ethylbenzene. The polymerization temperature is not specifically defined, but in general, falls between 0 and 200° C., preferably between 20 and 100° C.

In the graft copolymer of the invention to be obtained through the polymerization of the monomers noted above, the ratio of the polymer segments derived from the styrene-based monomer (A) to those derived from the terminal styrene derivative-modified olefin-based macromer (B) may be suitably controlled, depending on the amounts of the macromer (B) and the styrene-based monomer (A) to be mixed for their polymerization.

3. Styrene-based Resin Composition:

The styrene-based resin composition as claimed in claim 5 stated hereinunder comprises from 0.1 to 99.9% by weight of the graft copolymer (A+B) having the specific structure noted above and from 0.1 to 99.9% by weight of a thermoplastic resin (C) except the copolymer (A+B). In this, the thermoplastic resin (C) is not specifically defined, and any and every one except the graft copolymer (A+B) is employable. One or more thermoplastic resins, either singly or as combined, are usable to constitute the resin component (C). Specific examples of thermoplastic resins usable herein are mentioned below.

① Syndiotactic Styrene-based Polymer (syndiotactic polystyrene, SPS):

The tacticity of syndiotactic styrene-based polymers (syndiotactic polystyrene, SPS) is determined through nuclear magnetic resonance using isotopic carbon ($^{13}$C-NMR). In general, styrene-based polymers having a degree of syndiotacticity of racemidiad of 75% or higher, preferably 85% or higher, or of racemipentad of 30% or higher, preferably 50% or higher are referred to as syndiotactic styrene-based polymers. As monomers to be polymerized to give SPS, usable are styrene-based monomers such as those mentioned hereinabove. SPS includes homopolymers to be prepared by homopolymerization of one those monomers; copolymers to be prepared by copolymerization of two or more of those monomers; and even hydrogenates of those polymers and their mixtures, and copolymers consisting essentially of those polymers. Especially preferred styrene-based polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenates of those polystyrenes, and copolymers comprising constitutional units of those polystyrenes including their hydrogenates.

One or more styrene-based polymers such as those mentioned above are usable herein either singly or as combined.

The styrene-based polymers for use in the invention are not specifically defined for their molecular weight, but preferably have a weight-average molecular weight of not smaller than 10,000, more preferably not smaller than 50,000. They are not also specifically defined for their molecular weight distribution, which may vary in broad range.

The syndiotactic styrene-based polymers may be produced in any known method (for example, refer to Japanese Patent Application Laid-Open Nos. 62-187708, 1-46912 and 1-178505).

In the thermoplastic resin (C), which is one component constituting the styrene-based resin composition of the invention, the ratio of the syndiotactic styrene-based polymer to other thermoplastic polymers may be suitably determined in accordance with the object of the invention.

② Thermoplastic Resin Except SPS:

Any known thermoplastic resins except SPS are usable to constitute the styrene-based resin composition of the invention. Concretely mentioned are, for example, polyolefin-based resins such as linear high-density polyethylene, linear low-density polyethylene, high-pressure low-density polyethylene, isotactic polypropylene, syndiotactic polypropylene, block polypropylene, random polypropylene, polybutene, 1,2-polybutadiene, cyclic polyolefins, and poly-4-methylpentene; polystyrene-based resins such as polystyrene, HIPS, ABS, and AS; polyester-based resins such as polycarbonate, polyethylene terephthalate, and polybutylene terephthalate; polyamide-based resins such as polyamide 6, and polyamide 6,6; as well as polyphenylene ethers, and polyphenylene sulfides.

③ Others:

In addition to those noted above, also usable are rubber elastomers. For example, usable herein are natural rubber, polybutadiene, polyisoprene, polyisobutylene, neoprene, polysulfide rubber, Thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene-propylene rubber (EPR), ethylene-propylene-diene rubber (EPDM); core/shell type granular elastomers such as butadiene-acrylonitrile-styrene core/shell rubber (ABS), methyl methacrylate-butadiene-styrene core/shell rubber (MBS), methyl methacrylate-butyl acrylate-styrene core/shell rubber (MAS), octyl acrylate-butadiene-styrene core/shell rubber (MABS), alkyl acrylate/butadiene-acrylonitrile-styrene core/shell rubber (AABS), butadiene-styrene core/shell rubber (SBR), and siloxane-containing core/shell rubber, e.g., methyl methacrylate-butyl acrylate siloxane; and modified rubber elastomers as obtained by modifying those rubber elastomers.

Of those, especially preferred are SBR, SEB, SBS, SEBS, SIR, SEP, SIS, SEPS, core/shell rubber, EPM, EPDM, and their modified rubber elastomers. One or more of those rubber elastomers are usable herein, either singly or as combined.

The styrene-based resin composition of the invention comprises the graft copolymer (A+B) and the thermoplastic resin (C), wherein the amount of the graft copolymer (A+B) is from 0.1 to 99.9% by weight, preferably from 2 to 90% by weight, more preferably from 4 to 80% by weight, and that of the thermoplastic resin (C) except the copolymer (A+B) is from 0.1 to 99.9% by weight, preferably from 10 to 98% by weight, more preferably from 20 to 96% by weight.

The styrene-based resin composition as claimed in claim 6 stated hereinunder comprises a high-syndiotactic styrene-based polymer, syndiotactic polystyrene (SPS), and the terminal styrene derivative-modified olefin-based macromer (B), wherein the amount of SPS is from 0.1 to 99.9% by weight, preferably from 10 to 90% by weight, more preferably from 50 to 80% by weight, and that of the macromer (B) is from 0.1 to 99.9% by weight, preferably from 10 to 90% by weight, more preferably from 20 to 50% by weight.

The styrene-based resin composition of the invention may contain various additives, such as inorganic filler, antioxidant, nucleating agent, plasticizer, mold release agent, flame retardant, flame retardant promoter, and antistatic agent, without interfering with the object of the invention.

Various inorganic fillers are employable herein, including, for example, fibrous, granular and powder ones. The fibrous inorganic fillers include, for example, glass fibers, carbon fibers and whiskers. They may be in any form of fabrics, mats, chopped strands, short fibers and the like, and may also be whiskers themselves. The granular or powdery inorganic fillers include, for example, talc, carbon black, graphite, titanium dioxide, silica, mica, calcium carbonate, calcium sulfate, barium carbonate, magnesium carbonate, magnesium sulfate, barium sulfate, oxysulfates, tin oxide, alumina, kaolin, silicon carbide, metal powder, glass powder, glass flakes, glass beads, etc. Of those inorganic fillers, especially preferred are glass fillers such as glass powder, glass flakes, glass beads, glass filaments, glass fibers, glass rovings and glass mats.

The inorganic fillers are preferably surface-treated with coupling agents or the like to thereby improve their adhesiveness to resins. The coupling agents may be any conventional ones, including, for example, silane-based coupling agents, titanium-based coupling agents and the like.

One or more of those inorganic fillers are usable herein either singly or as combined, if desired.

The nucleating agent for use in the invention may be any conventional one, including, for example, metal carboxylates such as aluminium di(p-t-butylbenzoate), metal phosphates such as sodium methylene-bis(2,4-di-t-butylphenol) acid phosphate, and talc, phthalocyanlne derivatives, etc.

The plasticizer may be any conventional one, including, for example, polyethylene glycol, polyamide oligomer, ethylene-bis-stearamide, phthalates, polystyrene oligomer, polyethylene wax, mineral oil, and silicone oil.

The mold release agent may be any conventional one, including, for example, polyethylene wax, silicone oil, long-chain carboxylic acids, and salts of long-chain carboxylic acids.

The antioxidant may be any conventional one, including, for example, phosphorus-based, phenol-based, and sulfur-based antioxidants.

The flame retardant may be any conventional one, including, for example, brominated polymers such as brominated polystyrene, brominated syndiotactic polystyrene, and brominated polyphenylene ether; and brominated aromatic compounds such as brominated diphenylalkanes and brominated diphenyl ethers. The flame retardant promoter may be selected from any conventional antimony compounds such as antimony trioxide, and others. One or more of those compounds are employable either singly or as combined.

The method for producing the styrene-based resin composition of the invention is not specifically defined, and the conditions for the order of mixing the component parts and those for the mode of mixing them may be determined freely. The composition may be in the form of a melt as prepared by mixing the component parts followed by melting and kneading them. The method for melting and kneading them is not also specifically defined, and may be any ordinary one.

Now, the invention is described in more detail hereinunder with reference to the following Examples, which, however, are not intended to restrict the scope of the invention.

EXAMPLE 1

(1) Production of terminal styrene derivative-modified olefin-based macromer (B) (terminal styrene-modified ethylene-propylene copolymer):

500 ml of toluene was put into a one-liter separable flask equipped with a stirrer and a thermometer, and cooled to −60° C., to which were added an n-heptane solution of 25 mmols of diethylaluminium chloride and a toluene solution of 1.5 mmols of tris(2-methyl-1,3-butanedionato)vanadium, at the same temperature. Next, the flask was degassed to have a reduced pressure of 700 mmHg, into which was continuously fed a mixed gas of ethylene/propylene (40/60, by mol) to effect the copolymerization of ethylene and propylene. Next, a toluene solution of 100 mmols of divinylbenzene cooled at −60° C. was added to this, and the temperature of the reaction system was elevated up to −40° C. over a period of 1 hour. Then, the reaction system was further stirred for 0.5 hours under the condition. The resulting reaction mixture was poured into 5 liters of a methanol mixture containing a minor amount of hydrochloric acid, in which the polymer formed was thus precipitated. This was washed twice with 3 liters of methanol for 0.5 hours each. The resulting polymer was dried at 30° C. under reduced pressure for 12 hours. The ethylene-propylene copolymer thus obtained herein weighed 8.5 g. This was analyzed, and the following data were obtained. Precisely, through GPC, the copolymer was found to have a weight-average molecular weight of 32,000, and a ratio of Mw/Mn of 1.21. Through H-NMR, the ratio of secondary hydrogens to tertiary hydrogens in the copolymer indicated $C_2/C_3=49/51$ (mol/mol). From the molecular weight of the copolymer and from the proton intensity for the methylene moiety of the terminal vinyl group of the divinylbenzene unit of the copolymer, the copolymer was found to have about 2 styrene structure units at its terminal. The FT-IR pattern of the copolymer gave an absorption peak for the terminal vinyl group at 1630 cm$^{-1}$.

(2) Production of terminal styrene-modified ethylene-propylene copolymer-grafted syndiotactic polystyrene (A+B):

2.0 g of the terminal styrene-modified ethylene-propylene copolymer obtained in (1) was weighed and put into a 100-ml three-neck flask equipped with a stirrer and a thermometer, then fully degassed and purged with nitrogen. Next, 50 ml of toluene that had been entirely dewatered was added to this, and the copolymer was dissolved therein at 50° C. Next, 10 ml of styrene monomer that had been entirely dewatered was added to this, and heated up to 70°

C. Then, 0.15 mmols of triisobutyl aluminium and 0.012 mmols of triethyl aluminium were added thereto, and stirred for 5 minutes. Next, 2.5 ml of a toluene solution of methylaluminoxane/triisobutyl aluminium/ pentamethylcyclopentadienyltitanium trimethoxide (=75/ 25/1, by mol), where Ti=1 mmol/liter, was added thereto to effect the polymerization for 1 hour.

The resulting reaction mixture was poured into one liter of HCl/methanol solution, wherein the polymer formed was precipitated. After having been filtered, the polymer was washed twice with 1 liter of methanol for 0.5 hours each. The polymer was then dried at 30° C. under reduced pressure for 12 hours. The thus-dried polymer weighed 7.4 g. This was then subjected to Soxhlet extraction with cyclohexane for 12 hours, whereby was removed the non-reacted ethylene-propylene copolymer. Next, this was further dried at 80° C. under reduced pressure for 12 hours. The thus-obtained polymer weighed 7.2 g.

This polymer was analyzed, and the following data were obtained. Precisely, through GPC, the polymer was found to have a weight-average molecular weight of 352,000, and a ratio of Mw/Mn of 2.85. Through H-NMR, the ratio of syndiotactic polystyrene moiety/ethylene-propylene copolymer moiety was found to be 75/25 (wt/wt). The FT-IR pattern of the polymer gave no absorption peak at 1630 $cm^{-1}$ for the terminal vinyl group of the non-grafted, terminal styrene-modified ethylene-propylene copolymer.

Using a small-sized, injection-molding machine (MIN-7 Model, manufactured by Niigata Iron Works Co.—its cylinder temperature was 290° C., and its mold temperature was 150° C.), the polymer obtained herein was molded to produce dumbbell samples for tensile test (ASTM No. 4). These samples were tested according to JIS K7113, and were found to have a degree of tensile breaking elongation of 53%.

COMPARATIVE EXAMPLE 1

(1) Production of syndiotactic polystyrene:

10 ml of styrene monomer only was polymerized in the same manner as in Example 1 (2), without adding the terminal styrene-modified ethylene-propylene copolymer thereto. The resulting syndiotactic polystyrene had a weight-average molecular weight of 350,000.

(2) Production of polymer:

3.8 g of syndiotactic polystyrene obtained in (1), and 1.2 g of ethylene-propylene copolymer not modified with divinylbenzene at its terminal ($C_2/C_3$=53/47, mol/mol) were dissolved in 50 ml of 1,2,4-trichlorobenzene at 170° C., and then precipitated in methanol. The resulting polymer was dried at 30° C. under reduced pressure for 12 hours, then subjected to Soxhlet extraction with cyclohexane for 12 hours, and again dried at 80° C. under reduced pressure for 12 hours. The polymer thus obtained herein weighed 3.7 g.

This polymer was analyzed, and the following data were obtained. Precisely, through GPC, the polymer was found to have a weight-average molecular weight of 324,000. Through H-NMR, the ratio of syndiotactic polystyrene moiety/ethylene-propylene copolymer moiety was found to be 100/0 (wt/wt). As in this, the ethylene-propylene copolymer moiety was entirely removed through the extraction, and its existence in the polymer obtained herein was not detected.

In the same manner as in Example 1, this polymer was tested for the tensile breaking elongation, which was 1%.

PRODUCTION EXAMPLE 1

Production of syndiotactic polystyrene (SPS):

200 ml of toluene that had been entirely dewatered and 200 ml of styrene monomer were fed into a one-liter separable flask that had been entirely dried. Next, $9.9 \times 10^{-5}$ mols of triisobutyl aluminium (TIBA) and $9.9 \times 10^{-5}$ mols of triethyl aluminium (TEA) were added thereto, and heated up to 70° C.

Next, 1.7 ml of a toluene solution of an already-prepared catalyst mixture (methylaluminoxane/triisobutyl aluminium/pentamethylcyclopentadienyl titanium trimethoxide=75/25/1, by mol, with Ti=3 mmol/liter) was added to this to effect the polymerization for 2 hours. The resulting reaction mixture was poured into 5 liters of methanol, in which the polymer was precipitated. The polymer was again washed, then filtered, and dried at 200° C. under reduced pressure for 3 hours. The polymer thus obtained weighed 27.1 g.

This polymer was analyzed, and the following data were obtained. Through GPC, the polymer was found to have a weight-average molecular weight of 250,000, and a ratio of Mw/Mn of 3.0.

EXAMPLE 2

100 parts by weight of SPS obtained in Production Example 1, 15 parts by weight of ethylene-propylene rubber (trade name, EP-07P, manufactured by Nippon Synthetic Rubber Co.—this had an ethylene content of 80 mol %), and 5 parts by weight of the terminal styrene-modified ethylene-propylene copolymer-grafted syndiotactic polystyrene (A+B) obtained in Example 1 (2) were mixed to prepare a styrene-based resin composition, in which the component (A+B) was 4.2% by weight and the thermoplastic resin component (C), SPS+ethylene-propylene rubber, was 95.8% by weight. In the component (C), SPS was 87% by weight and ethylene-propylene rubber was 13% by weight. This styrene-based resin composition was kneaded, using a double-screw extruder (32 φ, manufactured by Nippon Steel Works Co.), at a controlled temperature of 290° C. and at 200 rpm, the amount of the composition being charged at a rate of 20 kg/hr. Thus were obtained about 300 g of resin pellets.

Using a small-sized, injection-molding machine (MIN-7 Model, manufactured by Niigata Iron Works Co.—its cylinder temperature was 290° C., and its mold temperature was 150° C.), these pellets were molded to produce dumbbell samples for tensile test (ASTM No. 4). These samples were tested according to JIS K7113, and were found to have a degree of tensile breaking elongation of 15%.

EXAMPLE 3

The same process as in Example 2 was repeated, except that the amount of the component (A+B) added was changed to 20 parts by weight. In the resin composition prepared herein, the component (A+B) was 14.8% by weight and the thermoplastic resin component (C), SPS+ethylene-propylene rubber, was 85.2% by weight. In the component (C), SPS was 87% by weight and ethylene-propylene rubber was 13% by weight. In the same manner as in Example 2, this resin composition was tested and was found to have a degree of tensile breaking elongation of 20%.

EXAMPLE 4

The same process as in Example 2 was repeated, except that polypropylene (trade name, Idemitsu Polypropylene J723, manufactured by Idemitsu Petrochemical Co.) was used in place of ethylene-propylene rubber. In the resin composition prepared herein, the component (A+B) was 4.2% by weight and the thermoplastic resin component (C), SPS+polypropylene, was 95.8% by weight. In the component (C), SPS was 87% by weight and polypropylene was 13% by weight. In the same manner as in Example 2, this resin composition was tested and was found to have a degree of tensile breaking elongation of 20%.

EXAMPLE 5

The same process as in Example 2 was repeated, except that high-density polyethylene (trade name, Idemitsu Polyethylene 110J, manufactured by Idemitsu Petrochemical Co.) was used in place of ethylene-propylene rubber. In the resin composition prepared herein, the component (A+B) was 4.2% by weight and the thermoplastic resin component (C), SPS+polyethylene, was 95.8% by weight. In the component (C), SPS was 87% by weight and polyethylene was 13% by weight. In the same manner as in Example 2, this resin composition was tested and was found to have a degree of tensile breaking elongation of 12%.

EXAMPLE 6

The same process as in Example 2 was repeated, except that linear low-density polyethylene (LLDPE) (trade name, Idemitsu Polyethylene 2024G, manufactured by Idemitsu Petrochemical Co.) was used in place of ethylene-propylene rubber. In the resin composition prepared herein, the component (A+B) was 4.2% by weight and the thermoplastic resin component (C), SPS+LLDPE, was 95.8% by weight. In the component (C), SPS was 87% by weight and LLDPE was 13% by weight. In the same manner as in Example 2, this resin composition was tested and was found to have a degree of tensile breaking elongation of 13%.

EXAMPLE 7

The same process as in Example 2 was repeated, except that 60 parts by weight of SPS that had been prepared in Production Example 1 was mixed with 40 parts by weight of the terminal styrene-modified ethylene-propylene copolymer-grafted syndiotactic polystyrene (A+B) that had been prepared in Example 1 (2), without adding ethylene-propylene rubber thereto. In the resin composition prepared herein, the component (A+B) was 42% by weight and the thermoplastic resin component (C) of SPS was 60% by weight. In the same manner as in Example 2, this resin composition was tested and was found to have a degree of tensile breaking elongation of 15%.

EXAMPLE 8

The same process as in Example 2 was repeated, except that 40 parts by weight of SPS that had been prepared in Production Example 1 was mixed with 60 parts by weight of the terminal styrene-modified ethylene-propylene copolymer-grafted syndiotactic polystyrene (A+B) that had been prepared in Example 1 (2), without adding ethylene-propylene rubber thereto. In the resin composition prepared herein, the component (A+B) was 60% by weight and the thermoplastic resin component (C) of SPS was 40% by weight. In the same manner as in Example 2, this resin composition was tested and was found to have a degree of tensile breaking elongation of 22%.

EXAMPLE 9

The same process as in Example 2 was repeated, except that 20 parts by weight of SPS that had been prepared in Production Example 1 was mixed with 80 parts by weight of the terminal styrene-modified ethylene-propylene copolymer-grafted syndiotactic polystyrene (A+B) that had been prepared in Example 1 (2), without adding ethylene-propylene rubber thereto. In the resin composition prepared herein, the component (A+B) was 80% by weight and the thermoplastic resin component (C) of SPS was 20% by weight. In the same manner as in Example 2, this resin composition was tested and was found to have a degree of tensile breaking elongation of 27%.

COMPARATIVE EXAMPLE 2

The same process as in Example 2 was repeated, except that only SPS that had been prepared in Production Example 1 was used. This was tested, and was found to have a degree of tensile breaking elongation of 1%.

COMPARATIVE EXAMPLE 3

The same process as in Example 2 was repeated, except that 100 parts by weight of SPS that had been prepared in Production Example 1 was mixed with 15 parts by weight of ethylene-propylene rubber (trade name, EP-07P, manufactured by Nippon Synthetic Rubber Co.—this had an ethylene content of 80 mol %), without adding the terminal styrene-modified ethylene-propylene copolymer-grafted syndiotactic polystyrene (A+B) thereto. The resin composition prepared herein was tested and was found to have a degree of tensile breaking elongation of 5%.

COMPARATIVE EXAMPLE 4

The same process as in Example 2 was repeated, except that 100 parts by weight of SPS that had been prepared in Production Example 1 was mixed with 15 parts by weight of polypropylene (trade name, Idemitsu Polypropylene J723, manufactured by Idemitsu Petrochemical Co.), without adding the terminal styrene-modified ethylene-propylene copolymer-grafted syndiotactic polystyrene (A+B) thereto. The resin composition prepared herein was tested and was found to have a degree of tensile breaking elongation of 3%.

PRODUCTION EXAMPLE 2

Production of terminal styrene-modified propylene macromer (B):

In the same manner as in Example 1 (1), except that 200 ml of propylene was used in place of the mixed gas, ethylene/propylene, to polymerize it for 2 hours, obtained herein was 1.8 g of a dry polymer. This polymer was analyzed, and the following data were obtained. Precisely, through GPC, the polymer was found to have a weight-average molecular weight of 122,000, and a ratio of Mw/Mn of 1.35. The FT-IR pattern of the polymer gave an absorption peak for the terminal vinyl group at 1630 $cm^{-1}$.

EXAMPLE 10

100 parts by weight of SPS that had been prepared in Production Example 1 was mixed with 25 parts by weight of the terminal styrene-modified ethylene-propylene copolymer (B) that had been prepared in Example 1 (1) to prepare a resin composition, in which SPS was 80% by weight and the component (B) was 20% by weight. Using a small-sized, injection-molding machine (MIN-7 Model, manufactured by Niigata Iron Works Co.—its cylinder temperature was 290° C., and its mold temperature was 150° C.), the resin composition was molded to produce dumbbell samples for tensile test (ASTM No. 4). These samples were tested according to JIS K7113, and were found to have a degree of tensile breaking elongation of 15%.

EXAMPLE 11

The same process as in Example 10 was repeated, except that the amount of the component (B) added was varied to 100 parts by weight. In the resin composition prepared herein, SPS was 50% by weight and the component (B) was 50% by weight. This resin composition was tested and was found to have a degree of tensile breaking elongation of 28%.

EXAMPLE 12

The same process as in Example 10 was repeated, except that 25 parts by weight of the terminal styrene-modified propylene polymer that had been prepared in Production Example 2 was used in place of the terminal styrene-modified ethylene-propylene copolymer of Example 1 (1). In the resin composition prepared herein, SPS was 80% by weight and the component (B) was 20% by weight. This resin composition was tested and was found to have a degree of tensile breaking elongation of 11%.

As has been described in detail hereinabove and as is obvious from the data illustrated hereinabove, the graft copolymer and the styrene-based resin composition of the present invention have good heat resistance, good chemical resistance, high stiffness and good miscibility with various resins, and are therefore useful as component parts for composite materials and also as heat-resistant elastomers.

While the invention has been described in detail and with reference to specific embodiments thereof, it will be apparent to one skilled in the art that various changes and modifications can be made therein without departing from the spirit and scope thereof.

What is claimed is:

1. A graft copolymer (A+B) of a styrene-based monomer (A) and a terminal styrene derivative-modified olefin-based macromer (B) of the following general formula (1), having a degree of syndiotacticity of racemidiad of 75% or higher for the stereospecificity of the chains derived from the styrene-based monomer:

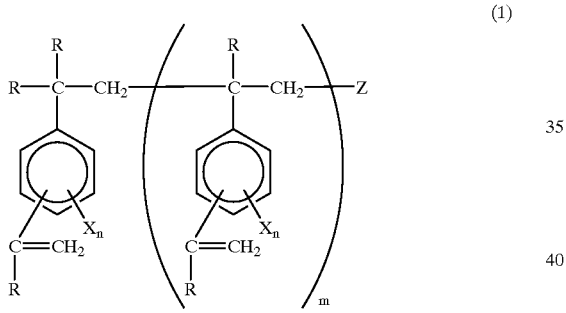

wherein R represents a hydrogen atom or an alkyl group having from 1 to 20 carbon atoms, and plural R's may be the same or different;

X represents any of the following; ① a hydrogen atom, ② a halogen atom, or ③ a substituent having one or more moieties selected from the group consisting of carbon, tin and silicon atoms;

n represents an integer of from 1 to 4, and when n is 2 or more, plural X's may be the same or different;

m represents 0 or a natural number; and

Z represents a chain moiety derived from an olefin-based monomer.

2. The graft copolymer (A+B) as claimed in claim 1, comprising from 0.1 to 99.9% by weight of polymer segments derived from the styrene-based monomer (A) and from 0.1 to 99.9% by weight of polymer segments derived from the terminal styrene derivative-modified olefin-based macromer (B) of formula (1).

3. A method for producing a graft copolymer (A+B) of a styrene-based monomer (A) and a terminal styrene derivative-modified olefin-based macromer (B) of the following general formula (1), having a high degree of syndiotacticity for the stereospecificity of the chains derived from the styrene-based monomer:

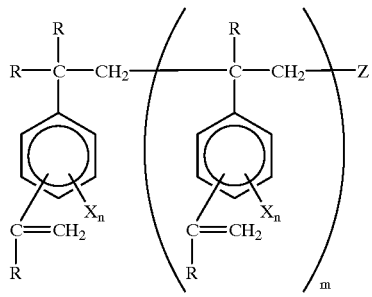

wherein R represents a hydrogen atom or an alkyl group having from 1 to 20 carbon atoms, and plural R's may be the same or different;

X represents any of the following; ① a hydrogen atom, ② a halogen atom, or ③ a substituent having one or more moieties selected from the group consisting of carbon, tin and silicon atoms;

n represents an integer of from 1 to 4, and when n is 2 or more, plural X's may be the same or different;

m represents 0 or a natural number; and

Z represents a chain moiety derived from an olefin-based monomer, which comprises dissolving a terminal styrene derivative-modified olefin-based macromer (B) of formula (1) in a styrene-based monomer (A), or in a solvent containing a styrene-based monomer (A), followed by copolymerizing (A) and (B) in the presence of a catalyst comprising (a) a transition metal compound and (b) (i) an oxygen-containing compound of a general formula (2):

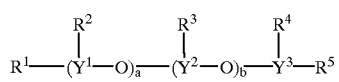

wherein $R^1$ to $R^5$ each represent an alkyl group having from 1 to 8 carbon atoms, and these may be the same or different;

$Y^1$ to $Y^3$ each represent an element of Group 13 of the Periodic Table, and these may be the same or different; and a and b each represent a number of from 0 to 50, provided that a+b is 1 or more;

and/or a general formula (3):

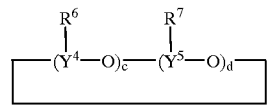

wherein $R^6$ and $R^7$ each represent an alkyl group having from 1 to 8 carbon atoms, and these may be the same or different;

$Y^4$ and $Y^5$ each represent an element of Group 13 of the Periodic Table, and these may be the same or different; and c and d each represent a number of from 0 to 50, provided that c+d is 1 or more, and/or (ii) a compound capable of reacting with the transition metal compound of the component (a) to form an ionic complex.

4. A method for producing a graft copolymer (A+B) of a styrene-based monomer (A) and a terminal styrene derivative-modified olefin-based macromer (B) of the following general formula (1), having a high degree of syndiotacticity for the stereospecificity of the chains derived from the styrene-based monomer:

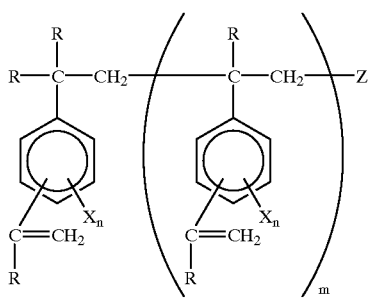
(1)

wherein R represents a hydrogen atom or an alkyl group having from 1 to 20 carbon atoms, and plural R's may be the same or different;

X represents any of the following; ① a hydrogen atom, ② a halogen atom, or ③ a substituent having one or more moieties selected from the group consisting of carbon, tin and silicon atoms;

n represents an integer of from 1 to 4, and when n is 2 or more, plural X's may be the same or different;

m represents 0 or a natural number; and

Z represents a chain moiety derived from an olefin-based monomer, which comprises dissolving a terminal styrene derivative-modified olefin-based macromer (B) of formula (1) in a styrene-based monomer (A) or in a solvent containing a styrene-based monomer (A), followed by copolymerizing (A) and (B) in the presence of a catalyst comprising (a) a transition metal compound, (b) (i) an oxygen-containing compound of a general formula (2):

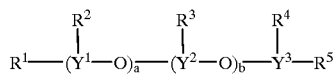
(2)

wherein $R^1$ to $R^5$ each represent an alkyl group having from 1 to 8 carbon atoms, and these may be the same or different;

$Y^1$ to $Y^3$ each represent an element of Group 13 of the Periodic Table, and these may be the same or different; and a and b each represent a number of from 0 to 50, provided that a+b is 1 or more;

and/or a general formula (3):

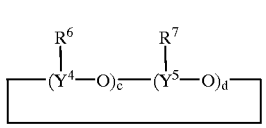
(3)

wherein $R^6$ and $R^7$ each represent an alkyl group having from 1 to 8 carbon atoms, and these may be the same or different;

$Y^4$ and $Y^5$ each represent an element of Group 13 of the Periodic Table, and these may be the same or different; and c and d each represent a number of from 0 to 50, provided that c+d is 1 or more, provided that c+d is 1 or more, and/or (ii) a compound capable of reacting with the transition metal compound of the component (a) to form an ionic complex, and (c) an alkylating agent.

5. A styrene-based resin composition comprising from 0.1 to 99.9% by weight of a graft copolymer (A+B) of claim 1, and from 0.1 to 99.9% by weight of a thermoplastic resin (C) except the copolymer (A+B).

6. A styrene-based resin composition comprising from 0.1 to 99.9% by weight of a terminal styrene derivative-modified olefin-based macromer (B) of formula (1):

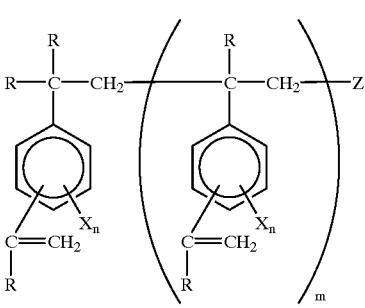
(1)

wherein R represents a hydrogen atom or an alkyl group having from 1 to 20 carbon atoms, and plural R's may be the same or different;

X represents any of the following; ① a hydrogen atom, ② a halogen atom, or ③ a substituent having one or more moieties selected from the group consisting of carbon, tin and silicon atoms;

n represents an integer of from 1 to 4, and when n is 2 or more, plural X's may be the same or different;

m represents 0 or a natural number; and

Z represents a chain moiety derived from an olefin-based monomer;

and from 0.1 to 99.9% by weight of a syndiotactic styrene-based polymer, syndiotactic polystyrene (SPS).

7. The graft copolymer of claim 1, wherein said the degree of syndiotacticity of racemidiad is 85% or higher for the stereospecificity of the chains derived from the styrene-based monomer.

* * * * *